3,267,139
N' - TRIMETHYLACETYL - N-PHENYLALKYL-SULFAMIDES AND -PHENYLCYCLOPROPYLSULFAMIDES

John J. Lafferty, Levittown, Pa., assignor to Smith Kline & French Laboratories, Philadelphia, Pa., a corporation of Pennsylvania
No Drawing. Filed Sept. 24, 1963, Ser. No. 311,196
7 Claims. (Cl. 260—556)

This invention relates to new N'-trimethylacetyl-N-phenylalkylsulfamides and -phenylcyclopropylsulfamides having pharmacodynamic activity. The compounds of this invention have central nervous system activity and also have anticonvulsant activity.

The compounds of this invention produce Parkinson-like symptoms in experimental animals and are therefore useful in preparing animals for evaluation of new drugs for anti-Parkinson activity.

The novel compounds of this invention are represented by the following formulas:

Formula I $$R_1-A-N(R_2)-SO_2-N(R_3)-C(=O)-C(CH_3)_2-CH_3$$
$$\text{(with } CH_3 \text{ branch)}$$

and

Formula II $$R_1-CH(-CH_2-)C(R_4)-N(R_2)-SO_2-N(R_3)-C(=O)-C(CH_3)_2-CH_3$$

when:

A represents lower alkylene having 2–3 carbon atoms;
$R_1$ represents phenyl, holaphenyl, trifluoromethylphenyl, lower alkylphenyl, lower alkoxyphenyl, aminophenyl, hydroxyphenyl, dihalophenyl, di-lower alkylphenyl, di-lower alkoxyphenyl or methylenedioxyphenyl; and
$R_2$, $R_3$ and $R_4$ represent hydrogen or lower alkyl.

Preferred compounds of this invention have the following formulas:

Formlula III $$R-C_6H_4-A-NH-SO_2-NH-C(=O)-C(CH_3)_3$$

Formula IV $$R-C_6H_4-CH(-CH_2-)CH-NH-SO_2-NH-C(=O)-C(CH_3)_3$$

when:

A represents lower alkylene having 2–3 carbon atoms, in particular —$CH_2CH_2$—, —$CH_2CH_2CH_2$— and $$-CH(CH_3)-CH_2-$$

and
R represents hydrogen, chloro or trifluoromethyl.

An advantageous compound of this invention is N'-trimethylacetyl-N-phenethylsulfamide.

By the terms "lower alkyl" and "lower alkoxy" where used herein groups having from 1 to 6, preferably 1 to 2, carbon atoms are indicated. The term "halo" where used herein denotes halogen having an atomic weight of less than 80.

The compounds of this invention are prepared by reacting the appropriate phenylalkylsulfamide or phenylcyclopropylsulfamide with trimethylacetyl chloride. The reaction is preferably carried out with an excess of the phenylalkylsulfamide or phenylcyclopropylsulfamide in an inert solvent such as an aromatic hydrocarbon, for example benzene or toluene, at elevated temperatures conveniently at the reflux temperature of the solvent. Concentrating and cooling the reaction mixture precipitates the N'-trimethylacetyl-N-phenylalkylsulfamide or -phenylcyclopropylsulfamide products.

The phenylalkylsulfamides and phenylcyclopropylsulfamides which are intermediates for the compounds of this invention are prepared as described in copending applications Serial Nos., 223,826, now Patent No. 3,143,549, and 242,651, now Patent No. 3,147,305. Briefly, the phenylalkylsulfamides are prepared by reacting a phenylalkylamine with sulfamide or with a sulfamoyyl chloride. The phenylcyclopropylsulfamides are prepared by reacting an N-lower alkyl(or acyl)-phenylcyclopropylamine with sulfuryl chloride followed by ammonia or the appropriate amine and, if required, hydrolyzing the N-acyl group.

The compounds of Formula II may be present as cis and trans isomers and as $d$ or $l$ optical isomers and the compounds of Formula I in which A is a branched lower alkylene group may be present as $d$ or $l$ optical isomers. It is intended to include in this invention all of these isomers, the separated cis and trans isomers and the resolved $d$ and $l$ isomers as well as mixtures thereof. These isomers are prepared by employing the appropriate isomeric phenylalkylsulfamide or phenylcyclopropylsulfamide intermediate.

The following examples are not limiting but are illustrative of the compounds of this invention and of the procedures for their preparation.

*Example 1*

A mixture of 24.2 g. of phenethylamine, 21.1 of sulfamide and 300 ml. of water is heated on a steam bath at about 90–95° C. for four hours. The resulting mixture is extracted with ether. The ethereal extract is washed with dilute hydrochloric acid and then extracted with 5% sodium hydroxide. Adding dilute hydrochloric acid to the basic extract precipitates the product which is recrystalized from ether-hexane to give phenethylsulfamide.

A solution of 55.0 g. of phenethylsulfamide and 16.5 g. of trimethylacetyl chloride in 500 ml. of benzene is refluxed for 18 hours. The solution is concentrated and cooled. The precipitate is filtered and recrystallized from chloroform to give N'-trimethylacetyl-N-phenethylsulfamide, M.P. 157–8° C.

*Example 2*

A mixture of 13.5 g. of 3-phenylpropylamine and 10.6 g. of sulfamide in 150 ml. of water is heated at 80–90° C. for four hours to give, after working up as in Example 1, 3-phenylpropylsulfamide.

A solution of 30 g. of 3-phenylpropylsulfamide and 8.4 g. of trimethylacetyl chloride in 400 ml. benzene is refluxed for 18 hours. The solution is concentrated and cooled. The precipitate is filtered and recrystallized from chloroform to give N'-trimethylacetyl-N-(3-phenylpropyl)sulfamide, M.P. 148–149° C.

*Example 3*

A solution of 29.5 g. of 2-phenylpropylsulfamide (prepared as in Example 1 from 2-phenylpropylamine and sulfamide) and 8.3 g. of trimethylacetyl chloride is refluxed in 200 ml. of benzene for 18 hours. The solution is concentrated and cooled. The precipitate is filtered and recrystallized from chloroform to give N'-trimethylacetyl-N-(2-phenylpropyl)sulfamide, M.P. 136–7° C.

*Example 4*

A solution of 46.0 g. of 2-phenylisopropylsulfamide (prepared as in Example 1 from 2-phenylisopropylamine and sulfamide) and 13.0 g. of trimethylacetyl chloride in 500 ml. of benzene is refluxed for 18 hours. The benzene is evaporated off leaving an oil which is dissolved in a minimum of ether and cooled. The precipitate is filtered and recrystallized from chloroform to give N'-trimethylacetyl-N-(2-phenylisopropyl)sulfamide, M.P. 184–5° C.

*Example 5*

A solution of 35.5 g. of 1-phenylethylsulfamide (prepared from 1-phenethylamine and sulfamide as in Example 1) and 10.5 g. of trimethylacetyl chloride in 400 ml. of benzene is refluxed for 18 hours. The solution is concentrated and cooled. The precipitate is filtered and recrystallized from chloroform to give N'-trimethylacetyl-N-(1-phenylethyl)sulfamide, M.P. 179–180° C.

*Example 6*

A solution of 28.0 g. of p-chlorophenethylsulfamide (prepared as in Example 1 from p-chlorophenethylamine and sulfamide) and 7.2 g. of trimethylacetyl chloride in 300 ml. of benzene is refluxed for 18 hours. The solution is concentrated and cooled. The precipitate is filtered and recrystallized from chloroform to give N'-trimethylacetyl - N - (p-chlorophenethyl)sulfamide, M.P. 147–8° C.

*Example 7*

A solution of 33.0 g. of m-chlorophenethylsulfamide (prepared as in Example 1 from m-chlorophenethylamine and sulfamide) and 8.4 g. of trimethylacetyl chloride is refluxed in 400 ml. of benzene for 18 hours. The solution is concentrated and cooled. The precipitate is filtered and recrystallized from chloroform to give N'-trimethylacetyl - N - (m-chlorophenethyl)sulfamide, M.P. 150–1° C.

*Example 8*

A solution of 33.0 g. of o-chlorophenethylsulfamide (prepared as in Example 1 from o-chlorophenethylamine and sulfamide) and 8.4 g. of trimethylacetyl chloride in 400 ml. of benzene is refluxed for 18 hours. The solution is concentrated and cooled. The precipitate is filtered and recrystallized from chloroform to give N'-trimethylacetyl - N - (o-chlorophenethyl)sulfamide, M.P. 180–181° C.

Similarly p-bromophenethylsulfamide, prepared by reacting p-bromophenethylamine with sulfamide, and p-fluorophenethylsulfamide, prepared by reacting p-fluorophenethylamine with sulfamide, are refluxed with trimethylacetyl chloride in benzene to give N'-trimethylacetyl-N-(p-bromophenethyl)sulfamide and N'-trimethylacetyl-N-(p-fluorophenethyl)sulfamide, respectively.

*Example 9*

Twenty-five grams of 3-methylphenethylamine and 10.3 g. of sulfamide in 300 ml. of water are heated at 90° C. for four hours. The mixture is extracted with ether and the extract is washed with dilute hydrochloric acid, then extracted with dilute aqueous sodium hydroxide solution. The basic extract is acidified and the precipitate is filtered off and recrystallized from ether-hexane to give 3-methylphenethylsulfamide.

A solution of 21.4 g. of 3-methylphenethylsulfamide and 6.0 g. of trimethylacetyl chloride in 350 ml. of toluene is heated at reflux for 16 hours. Working up as in Example 1 gives N'-trimethylacetyl-N-(3-methylphenethyl)sulfamide.

*Example 10*

A mixture of 18.9 g. of 4-trifluoromethylphenethylamine (prepared by reducing 4-trifluoromethylbenzoic acid with lithium aluminum hydride in ether, treating the resulting 4-trifluoromethylbenzyl alcohol with hydrobromic acid, then with sodium cyanide and hydrogenating the resulting cyano compound to give the 4-trifluoromethylphenethylamine) and 10.5 g. of sulfamide in water is heated on a steam bath for 3.5 hours to give 4-trifluoromethylphenethylsulfamide.

A solution of 3.0 g. of trimethylacetyl chloride and 13.4 g. of 4-trifluoromethylphenethylsulfamide in 250 ml. of benzene is heated at reflux for 18 hours to give, after working up as in Example 1, N'-trimethylacetyl-N-(4-trifluoromethylphenethyl)sulfamide.

*Example 11*

By the procedure of Example 1, 13.5 g. of N-methylphenethylamine and 10.5 g. of sulfamide in 150 ml. of water are heated at 90–95° C. to give, after working up, N-methyl-N-phenethylsulfamide.

A mixture of 3.0 g. of trimethylacetyl chloride, 10.7 g. of N-methyl-N-phenethylsulfamide and 200 ml. of benzene is refluxed for 20 hours to give, after concentrating, cooling, filtering and recrystallizing, N'-trimethylacetyl-N-methyl-N-phenethylsulfamide.

*Example 12*

A mixture of 10.7 g. of N-methyl-N-phenethylsulfamide, prepared as in Example 11, and 5.0 g. of sodium hydroxide in aqueous solution is treated with 6.3 g. of dimethylsulfate. The mixture is stirred at room temperature for three hours. Extracting with ether, washing the extract with water, drying, concentrating and distilling gives N,N'-dimethyl-N-phenethylsulfamide.

A solution of 3.0 g. of trimethylacetyl chloride and 11.4 g. of N,N'-dimethyl-N-phenethylsulfamide in 300 ml. of toluene is heated at reflux for 15 hours. The solution is concentrated, cooled and filtered. The solid material is recrystallized from chloroform to give N'-trimethylacetyl-N,N'-dimethyl-N-phenethylsulfamide.

*Example 13*

By the procedure of Example 12, 10.0 g. of phenethylsulfamide, prepared as in Example 1, in aqueous sodium hydroxide is reacted with 6.3 g. of dimethylsulfate at room temperature to give N'-methyl-N-phenethylsulfamide.

Refluxing a solution of 3.0 g. of trimethylacetyl chloride and 10.6 g. of N'-methyl-N-phenethylsulfamide in 250 ml. of benzene for 16 hours and working up as in Example 1 gives N'-trimethylacetyl-N'-methyl-N-phenethyl sulfamide.

*Example 14*

By the procedure of Example 1, 19.1 g. of 2,4-dichlorophenethylamine and 10.6 g. of sulfamide are reacted in aqueous solution and worked up to give 2,4-dichlorophenethylsulfamide.

Similarly using, in place of 2,4-dichlorophenethylamine, 3,4-dichlorophenethylamine, 2,4-dimethylphenethylamine, 3,4-dimethoxyphenethylamine and 3,4-methylenedioxyphenethylamine the following products are obtained: 3,4-dichlorophenethylsulfamide, 2,4-dimethylphenethylsulfamide, 3,4-dimethoxyphenethylsulfamide and 3,4-methylenedioxyphenethylsulfamide, respectively.

Refluxing each of the above prepared phenethylsulfamide derivatives with trimethylacetyl chloride in benzene for 18 hours and working up as in Example 1 furnishes the following products:

N'-trimethylacetyl-N-(2,4-dichlorophenethyl)sulfamide,
N'-trimethylacetyl-N-(3,4-dichlorophenethyl)sulfamide,
N'-trimethylacetyl-N-(2,4-dimethylphenethyl)sulfamide,
N'-trimethylacetyl-N-(3,4-dimethoxyphenethyl)sulfamide, and
N'-trimethylacetyl-N-(3,4-methylenedioxyphenethyl)-sulfamide, respectively.

*Example 15*

A solution of 25.8 g. of p-acetoxyphenethylsulfamide (prepared by reacting p-methoxyphenethylamine with sulfamide, heating the resulting p-methoxyphenethylsulfamide with 37% hydrochloric acid for five hours at 100° C. and heating the resulting p-hydroxyphenethylsulfamide with acetyl chloride) and 6.0 g. of trimethylacetyl chloride in 400 ml. of benzene is heated at reflux for 15 hours. The solution is concentrated and cooled. The precipitate is filtered, recrystallized from chloroform and the recrystallized material is warmed with dilute sodium hydroxide solution. The basic solution is neutralized with dilute hydrochloric acid and extracted with benzene. Concentrating the benzene extracts and recrystallizing the residue gives N'-trimethylacetyl-N-(p-hydroxyphenethyl)-sulfamide.

*Example 16*

Refluxing a solution of 24.5 g. of p-nitrophenethylsulfamide (prepared as in Example 1 from p-nitrophenethylamine and sulfamide) and 6.0 g. of trimethylacetyl chloride in 400 ml. of benzene for 18 hours and working up as in Example 1 gives N'-trimethylacetyl-N-(p-nitrophenethyl)sulfamide.

Hydrogenating the above prepared nitro compound in methanol at 25° C. using platinum oxide as catalyst gives N'-trimethylacetyl-N-(p-aminophenethyl)sulfamide.

*Example 17*

Twenty grams of trans-2-phenylcyclopropylamine is heated at reflux in ethyl formate for ten hours. Upon evaporation and recrystallization of the residue from ether there is obtained trans-N-formyl-2-phenylcyclopropylamine.

A mixture of 8.0 g. of trans-N-formyl-2-phenylcyclopropylamine and 1.2 g. of sodium hydride in 100 ml. of benzene is refluxed for one hour to give the sodio derivative of trans-N-formyl-2-phenylcyclopropylamine. A solution of 6.7 g. of sulfuryl chloride in 20 ml. of benzene is added with stirring at 0–5° C. This mixture is treated with gaseous ammonia until a large excess is present and then allowed to stand overnight. The mixture is filtered and the filtrate is washed with water and evaporated to dryness in vacuo to give N-formyl-2-phenylcyclopropylsulfamide. This N-formyl compound is heated with 3% aqueous hydrochloric acid for one hour and extracted with benzene. The benzene extracts are washed with water and concentrated. The residue is recrystallized from benzene to give trans-2-phenylcyclopropylsulfamide, M.P. 109–110° C.

Refluxing 3.0 g. of trimethylacetyl chloride with 10.6 g. of trans-2-phenylcyclopropylsulfamide in benzene and working up as in Example 1 gives trans-N'-trimethylacetyl-N-(2-phenylcyclopropyl)sulfamide.

*Example 18*

By the procedure of Example 17, trans-2-(4-chlorophenyl)cyclopropylamine is converted to the corresponding N-formyl derivative (9.8 g.) which is then refluxed in benzene with 1.2 g. of sodium hydride for one hour. The resulting sodio derivative is treated with 6.7 g. of sulfuryl chloride in benzene at 0° C. An excess of gaseous ammonia is added and the mixture is allowed to stand overnight. Working up as in Example 17 and heating with dilute aqueous hydrochloric acid gives trans-2-(4-chlorophenyl)cyclopropylsulfamide.

A solution of 3.0 g. of trimethylacetyl chloride and 12.3 g. of trans-2-(4-chlorophenyl)cyclopropylsulfamide in benzene is refluxed for 18 hours to give, after working up as in Example 1, trans-N'-trimethylacetyl-N-[2-(4-chlorophenyl)cyclopropyl]sulfamide.

cis-Ethyl-2-(4-chlorophenyl)cyclopropane carboxylate is refluxed for five hours with potassium hydroxide in aqueous ethanol, the resulting cis carboxylic acid is treated with diazomethane in ether, the resulting methyl ester in refluxed for five hours with hydrazine hydrate in ethanol and the hydrazide is diazotized by treating with hydrochloric acid and sodium nitrite at 0° C. to give the cis azide. Rearrangement of the azide by refluxing in methanol for five hours gives the methyl urethan which is hydrolyzed by refluxing with a saturated methanolic solution of barium hydroxide octahydrate for 36 hours. Filtering and concentrating to dryness gives, as the residue, cis-2-(4-chlorophenyl)cyclopropylamine.

Using cis-2-(4-chlorophenyl)cyclopropylamine in place of the trans isomer in the procedure described above gives cis-2-(4-chlorophenyl)cyclopropylsulfamide which on refluxing with trimethylacetyl chloride in benzene gives cis-N' - trimethylacetyl - N - [2 - (4 - chlorophenyl)cyclopropyl]sulfamide.

*Example 19*

A mixture of 7.3 g. of N-methyl-2-phenylcyclopropylamine and 6.7 g. of sulfuryl chloride in 100 ml. of benzene is stirred at about 0° C. for 30 minutes. The mixture is treated with an excess of gaseous ammonia and allowed to stand overnight. After filtering, washing the filtrate with water, evaporating to dryness in vacuo and recrystallizing the residue from benzene, N-methyl-N-(2-phenylcyclopropyl)sulfamide is obtained.

Refluxing 3.0 g. of trimethylacetyl chloride and 11.3 g. of N-methyl-N-(2-phenylcyclopropyl)sulfamide in benzene for 18 hours, then concentrating, cooling, filtering and recrystallizing gives N'-trimethylacetyl-N-methyl-N-(2-phenylcyclopropyl)sulfamide.

Similarly using N-n-butyl-2-phenylcyclopropylamine (prepared by reacting equimolar amounts of n-butyl bromide and 2-phenylcyclopropylamine in ethanol with potassium carbonate) in the above reaction the product is N'-trimethylacetyl - N - n - butyl - N - (2-phenylcyclopropyl)-sulfamide.

What is claimed is:

1. A compound selected from the group consisting of compounds having the following formulas:

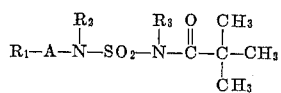

and

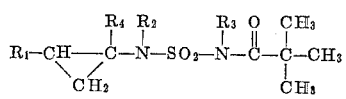

in which:

A is lower alkylene having 2–3 carbon atoms;
$R_1$ is a member selected from the group consisting of phenyl, halophenyl, trifluoromethylphenyl, lower alkylphenyl, lower alkoxyphenyl, aminophenyl, hydroxyphenyl, dihalophenyl, di-lower alkylphenyl, di-lower alkoxyphenyl and methylenedioxyphenyl; and
$R_2$, $R_3$ and $R_4$ are members selected from the group consisting of hydrogen and lower alkyl.

2. A compound of the formula:

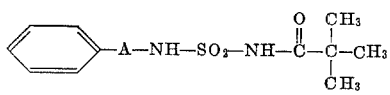

in which A is lower alkylene having 2–3 carbon atoms.

3. A compound of the formula:
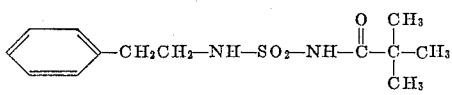
4. A compound of the formula:
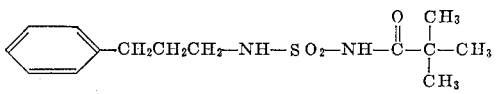
5. A compound of the formula:
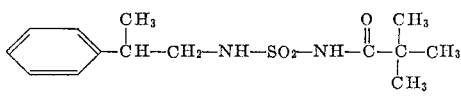
6. A compound of the formula:
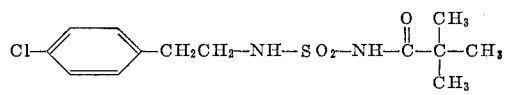
7. A compound of the formula:
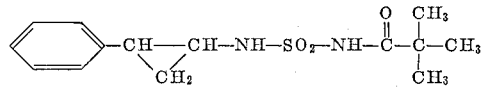
References Cited by the Examiner
UNITED STATES PATENTS
3,143,549   8/1964   Lafferty et al. _____ 260—268
3,147,305   9/1964   Lafferty et al. _____ 260—556
WALTER A. MODANCE, *Primary Examiner.*
HARRY I. MOATZ, *Assistant Examiner.*